(12) United States Patent
Matsumoto

(10) Patent No.: US 10,114,170 B2
(45) Date of Patent: Oct. 30, 2018

(54) DISPLAY APPARATUS

(71) Applicant: SAKAI DISPLAY PRODUCTS CORPORATION, Sakai-shi, Osaka (JP)

(72) Inventor: Kouji Matsumoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/487,814

(22) Filed: Apr. 14, 2017

(65) Prior Publication Data
US 2017/0219767 A1 Aug. 3, 2017

Related U.S. Application Data

(63) Continuation of application No. PCT/JP2014/077689, filed on Oct. 17, 2014.

(51) Int. Cl.
*F21V 8/00* (2006.01)
*G02F 1/1333* (2006.01)
*G02F 1/1335* (2006.01)

(52) U.S. Cl.
CPC ........... *G02B 6/0088* (2013.01); *G02B 6/009* (2013.01); *G02F 1/1333* (2013.01);
(Continued)

(58) Field of Classification Search
CPC .. G02B 6/0088; G02B 6/009; G02F 1/133308
(Continued)

(56) References Cited

U.S. PATENT DOCUMENTS 8,958,022 B2 * 2/2015 Youk .................... G02B 6/0083
349/161
9,121,988 B2 * 9/2015 Lee ....................... G02B 6/0031
(Continued)

FOREIGN PATENT DOCUMENTS

JP 2004-53682 A 2/2004
JP 2007-017737 A 1/2007
(Continued)

OTHER PUBLICATIONS

Int'l. Search Report issued in Int'l. App. No. PCT/JP2014/077689, dated Jan. 13, 2015.

*Primary Examiner* — Bryon T Gyllstrom
(74) *Attorney, Agent, or Firm* — Greer Burns & Crain Ltd.

(57) ABSTRACT

A display apparatus according to an embodiment of the present invention includes: a display panel to display an image on a front surface thereof; a light guide plate being configured such that an upper surface thereof faces a rear surface of the display panel; an optical sheet being located between the display panel and the light guide plate, and having first and second sides parallel to each other and third and fourth sides perpendicular to the first and second sides; a panel support portion including a frame that has a first surface being in contact with the upper surface of the light guide plate and a second surface supporting a peripheral edge of the rear surface of the display panel; and a sheet support portion protruding from the frame of the panel support portion into a gap between the light guide plate and the optical sheet, wherein the sheet support portion has a protruding portion that holds at least one portion of the first side of the optical sheet between the protruding portion itself and the display panel.

9 Claims, 3 Drawing Sheets

(52) U.S. Cl.
CPC ...... *G02F 1/1335* (2013.01); *G02F 1/133308* (2013.01); *G02F 2001/133314* (2013.01); *G02F 2001/133317* (2013.01)

(58) Field of Classification Search
USPC ........................................................ 362/606
See application file for complete search history.

(56) References Cited

U.S. PATENT DOCUMENTS

| | | | |
|---|---|---|---|
| 9,417,473 B2* | 8/2016 | Ozeki | H04N 9/30 |
| 9,467,641 B2* | 10/2016 | Shimomichi | G06F 1/1601 |
| 2002/0080298 A1* | 6/2002 | Fukayama | G02F 1/133308 |
| | | | 349/58 |
| 2004/0109104 A1* | 6/2004 | Lee | G02F 1/133308 |
| | | | 349/58 |
| 2004/0135936 A1* | 7/2004 | Lee | G02B 6/0043 |
| | | | 349/64 |
| 2007/0008450 A1 | 1/2007 | Ueda | |
| 2008/0266487 A1 | 10/2008 | Furukawa | |
| 2011/0273631 A1* | 11/2011 | Hayashi | G02B 6/0091 |
| | | | 348/790 |
| 2012/0281153 A1 | 11/2012 | Kuromizu | |
| 2015/0241730 A1 | 8/2015 | Kondoh | |

FOREIGN PATENT DOCUMENTS

| | | |
|---|---|---|
| JP | 2008-275870 A | 11/2008 |
| JP | 2013-206574 A | 10/2013 |
| WO | WO 2007/132597 A1 | 11/2007 |
| WO | WO 2011/093119 A1 | 8/2011 |
| WO | WO 2014/054519 A1 | 4/2014 |

\* cited by examiner

DISPLAY APPARATUS

This is a continuation of International Application No. PCT/JP2014/077689, with an international filing date of Oct. 17, 2014, the contents of which are hereby incorporated by reference.

BACKGROUND

1. Technical Field

The present invention relates to a display apparatus displaying an image by illuminating a display panel by light directed from a light source via a light guide plate.

2. Description of the Related Art

A display apparatus including a rectangular liquid crystal panel as an image display portion includes a backlight unit located at a back of the liquid crystal panel, and is configured to have illumination light from the backlight unit be transmitted through, and modulated by, the liquid crystal panel and thus to display an image on a front surface of the liquid crystal panel. Backlight units are roughly classified into direct-type backlight units and edge light-type backlight units. Recently, edge light-type backlight units have been in wide use from the point of view of decreasing the power consumption and reducing the thickness thereof.

An edge light-type backlight unit includes a backlight chassis having a shallow box-like shape, and a light guide plate and a light source accommodated in the backlight chassis. The light guide plate is a rectangular flat plate formed of glass or a light-transmissive resin material, and is placed on a bottom surface of the backlight chassis. The light source is attached to one side wall of the backlight chassis so as to face one side surface of the light guide plate. Light directed from the light source enters into the light guide plate from the one side surface thereof, propagates inside the light guide plate, and is output while being distributed in one wide surface of the light guide plate that is exposed to an opening of the backlight chassis.

The light guide plate is provided such that the one wide surface thereof faces a rear surface of the liquid crystal panel, and a rectangular optical sheet is located between the surfaces, facing each other, of the light guide plate and the liquid crystal panel. The optical sheet is an optical element having functions of diffusing and converging light, and light output from the light guide plate is directed toward the liquid crystal panel via the optical sheet.

The optical sheet is expandable and contractible by heat from the light source, and thus is supported at a portion of a peripheral edge thereof in a longitudinal direction so as to be allowed to be expanded and contracted. The optical sheet is supported by, for example, support pins inserted into holes provided in the portion of the peripheral edge thereof. The support pins are provided on a support portion supporting the optical sheet, on the light guide plate or the like (see, for example, WO2011/093119 (hereinafter "Patent Document 1")). The display apparatus is configured such that when the display apparatus is used, the support pins are situated upward. With such an arrangement, the optical sheet is suspended with the weight thereof.

A display apparatus is usually used such that support pins are situated upward, but may be occasionally used at a different orientation. However, with the above-described configuration, the support pins are not situated upward when the orientation of the display apparatus is changed. In such a case, the structure for suspending the optical sheet is not well balanced. This causes the stress to be concentrated on the hole into which the support pins are inserted, and thus easily breaks the optical sheet. In addition, the support pins are easily pulled out from the holes, which may undesirably cause the optical to come off.

SUMMARY

The present invention made in light of the above-described situation has an object of providing a display apparatus preventing an optical sheet from being broken or coming off when being used in a state where the orientation thereof is changed.

A display apparatus according to an embodiment of the present invention includes a display panel displaying an image on a surface thereof; a light guide plate located to face another surface of the display panel; an optical sheet located between the display panel and the light guide plate; and a sheet support portion located between the light guide plate and the optical sheet, the sheet support portion supporting one portion of a peripheral edge of the optical sheet. Another portion of the peripheral edge of the optical sheet is held between the display panel and the sheet support portion.

According to an embodiment of the present invention, the other portion of the peripheral edge of the optical sheet is held between the display panel and the sheet support portion. Therefore, the load applied, to the one portion of the peripheral edge of the optical sheet, by being the optical sheet being supported is alleviated. Therefore, the optical sheet is prevented from being broken by the concentration of the load by being the optical sheet being supported.

In the display apparatus according to an embodiment of the present invention, the sheet support portion is quadrangular frame-shaped, and one side portion thereof is longer than another side portion facing the one side portion in a direction in which the display panel and the light guide plate face each other; a portion of the peripheral edge of the optical sheet that corresponds to a crossing side portion of the sheet support portion crossing the one side portion is supported by the crossing side portion; and a portion of the peripheral edge of the optical sheet that corresponds to the one side portion of the sheet support portion is held between the display panel and the one side portion.

According to an embodiment of the present invention, in the case where the display apparatus is located such that one side portion of the sheet support portion is situated upward, the optical sheet is held between the one side portion and the liquid crystal panel, and the optical sheet is supported by the crossing side portion. Therefore, in the case where the display apparatus is used with the orientation thereof being changed, the optical sheet is prevented from coming off.

In the display apparatus according to an embodiment of the present invention, the sheet support portion is quadrangular frame-shaped, and includes a protruding portion protruding toward the optical sheet, the protruding portion being provided at a center of one side portion in a longitudinal direction of the sheet support portion; a portion of the peripheral edge of the optical sheet that corresponds to a crossing side portion of the sheet support portion crossing the one side portion is supported by the crossing side portion; and a portion of the peripheral edge of the optical sheet that corresponds to the one side portion of the sheet support portion is held between the display panel and the protruding side portion.

According to an embodiment of the present invention, in the case where the display apparatus is located such that one side portion of the sheet support portion is situated upward, the optical sheet is held between the protrusion portion on the one side portion and the liquid crystal panel, and the optical sheet is supported by the crossing side portion. Therefore, in the case where the display apparatus is used with the orientation thereof being changed, the optical sheet is prevented from coming off.

In addition, the optical sheet is held only at a portion thereof corresponding to the protruding portion located at the center of the one side portion of the sheet support portion. Therefore, the expansion of a portion of the optical sheet corresponding to the one side portion of the sheet support portion is accommodated.

The display apparatus according to an embodiment of the present invention further includes a panel support portion having a frame shape and supporting the display panel. The sheet support portion is located to protrude from an inner circumferential surface of the panel support portion.

According to an embodiment of the present invention, the sheet support portion and the panel support portion are formed integrally with each other. Therefore, the number of the components of the display apparatus is decreased.

According to an embodiment of the present invention, the optical sheet is held between the liquid crystal panel and the sheet support portion. Therefore, in the case where the display apparatus is used with the orientation thereof being changed, the optical sheet is prevented from being broken or coming off.

DETAILED DESCRIPTION

Hereinafter, a display apparatus according to the present invention will be described in detail with reference to the drawings showing embodiments thereof.
(Embodiment 1)

Figure 1:
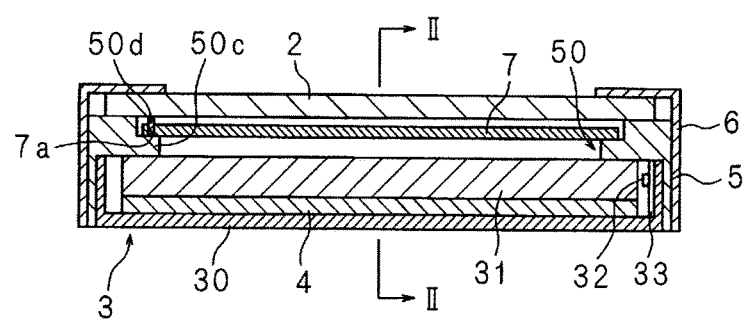
FIG. 1 is a vertical cross-sectional view of a display apparatus according to embodiment 1.
Figure 2:
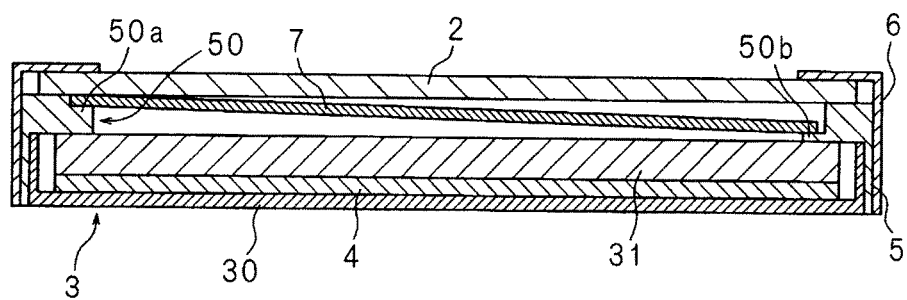
FIG. 2 is a cross-sectional view taken along line II-II in FIG. 1.

FIG. 1 is a vertical cross-sectional view of a display apparatus according to embodiment 1. FIG. 2 is a cross-sectional view taken along line II-II in FIG. 1. The display apparatus 1 includes a liquid crystal panel 2 displaying an image on a front surface thereof and a backlight unit 3 located at a back of the liquid crystal panel 2.

The backlight unit 3 includes a backlight chassis 30, a light guide plate 31, and a light source 32. The backlight chassis 30 includes a rectangular bottom plate and side plates vertically rising from four sides of the bottom plate, and has a shallow box-type shape opened at one surface thereof.

The light guide plate 31 is provided in the form of a rectangular flat plate formed of glass or a light-transmissive resin material, and is placed on a bottom surface of the backlight chassis 30 with a reflective sheet 4 being provided between the bottom surface and the light guide plate 31. The light guide plate 31 has two wide surfaces, and one of the two wide surfaces is exposed to the opening of the backlight chassis 30 and the other wide surface is in contact with the reflective sheet 4. The light source 32 is an LED, and is secured to a substrate 33 attached to one of the side plates of the backlight chassis 30 so as to face one side surface of the light guide plate 31.

The display apparatus 1 further includes a panel chassis 5, a bezel 6 and an optical sheet 7. The panel chassis 5 includes a rectangular frame and side plates vertically rising from an outer peripheral edge of the frame.

The side plates of the panel chassis 5 are located outer to, so as to cover, the side plates of the backlight chassis 30. One of surfaces of the frame of the panel chassis 5 and the bottom plate of the backlight chassis 30 hold the light guide plate 31 therebetween. On another surface of the frame of the panel chassis 5, the liquid crystal panel 2 is located in a state where a rear surface of a peripheral edge thereof is supported by another surface of the frame of the panel chassis 5.

The bezel 6 includes a rectangular frame and side plates vertically rising from an outer peripheral edge of the frame. The side plates of the bezel 6 are located outer to, so as to cover, the side plates of the panel chassis 5. One of surfaces of the frame of the bezel 6 and the other surface of the frame of the panel chassis 5 hold the peripheral edge of the liquid crystal panel 2 therebetween.

An inner circumferential surface of the frame of the panel chassis 5 has a sheet support portion 50 protruding inward therefrom. The sheet support portion 50 is formed integrally with the panel chassis 5, which decreases the number of the components of the display apparatus.

The sheet support portion 50 is thinner than the frame of the panel chassis 5, and faces the rear surface of the liquid crystal panel 2 with a gap being provided therebetween. The optical sheet 7 is rectangular, has a peripheral edge thereof supported by the sheet support portion 50 as described below, and is located between the sheet support portion 50 and the liquid crystal panel 2. The optical sheet 7 diffuses and converges light.

In the display apparatus having the above-described structure, light emitted from the light source 32 enters into the light guide plate 31 from the one side surface thereof, propagates inside the light guide plate 31, and is output while being distributed in the one wide surface thereof. The light output from the light guide plate 31 is diffused and converged by the optical sheet 7, and is incident on the liquid crystal panel 2. The liquid crystal panel 2 modulates and transmits the light to display an image on the front surface thereof.

Figure 3:
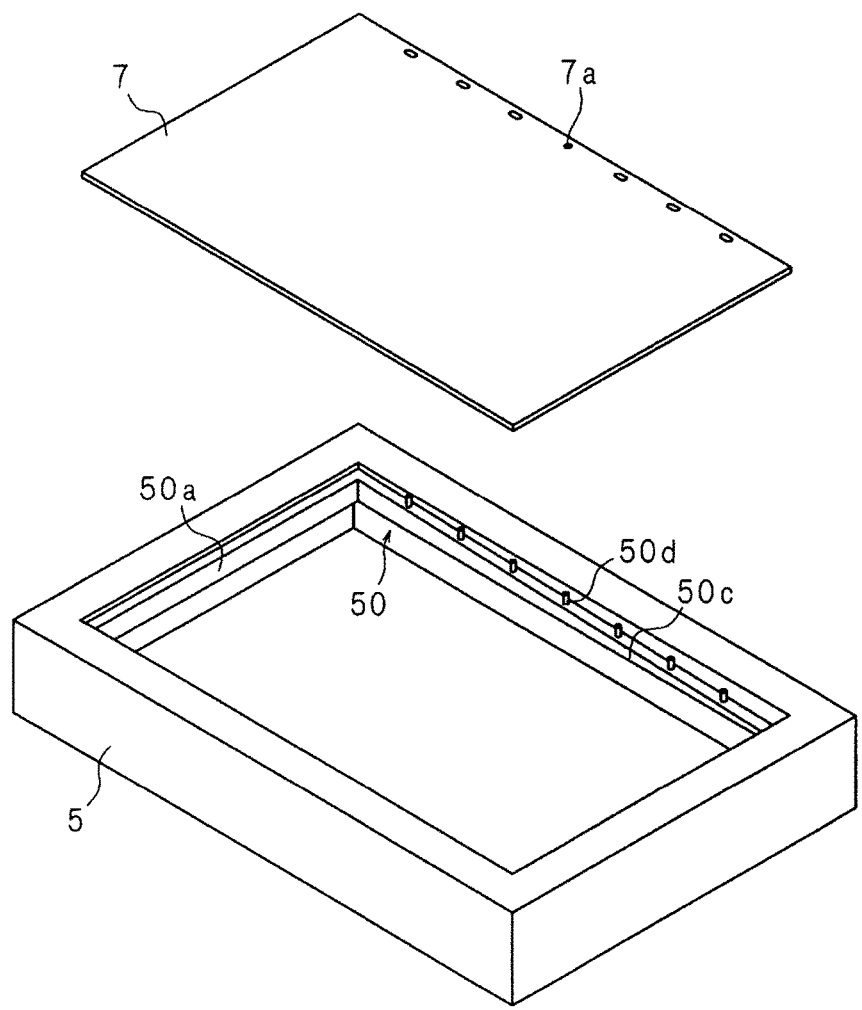
FIG. 3 provides an external isometric view of a panel chassis and an external isometric view of an optical sheet of a display apparatus according to embodiment 1.

FIG. 3 provides an external isometric view of the panel chassis 5 and an external isometric view of the optical sheet 7 of a display apparatus according to embodiment 1. The sheet support portion 50 protruding from the frame of the panel chassis 5 includes two long side portions and two short side portions. One of the long side portions, namely, a long side portion 50c, has seven support pins 50d provided thereon.

The optical sheet 7 has seven holes 7a along the peripheral edge, in a longitudinal direction, corresponding to the long side portion 50c of the sheet support portion 50. The hole 7a at the center has a circular shape having the same diameter as that of each of the support pins 50d, and the other holes 7a to the sides of the central hole 7a each have an elliptical shape extending in the longitudinal direction of the optical sheet 7 and having a shorter diameter that is the same as the diameter of each support pin 50d. The support pins 50d provided along the long side portion 50c are respectively inserted into the holes 7a, so that the optical sheet 7 is supported by the sheet support portion 50.

As shown in FIG. 2, one of the short side portions, namely, a short side portion 50a, of the sheet support portion 50 is thicker than the other short portion 50b facing the short side portion 50a, namely, is longer than the other short portion 50b in a direction in which the liquid crystal panel 2 and the light guide plate 31 face each other. Therefore, the short side portion 50a is located closer to the liquid crystal panel 2 than the other side portion 50b. A portion of the optical sheet 7 corresponding to the short side portion 50a is held between the liquid crystal panel 2 and the short side portion 50a.

The display apparatus 1 according to embodiment 1 may be used in a state where the long side portion 50c of the sheet support portion 50 is situated upward, or may be used in a state where the short side portion 50a is situated upward.

In the case where the display apparatus 1 is used in the state where the long side portion 50c of the sheet support portion 50 is situated upward, the optical sheet 7 is suspended by the weight thereof from the seven support pins 50d provided along the long side portion 50c and is used without being sagged or wrinkled. Therefore, the optical sheet 7 diffuses and converges the light output from the light guide plate 31 and outputs the light toward the liquid crystal panel 2 in a superb manner. Thus, the liquid crystal panel 2 displays an image stably.

The optical sheet 7 is thermally expanded mainly by the effect of the heat generated by the light emission of the light source 32. The thermal expansion of the optical sheet 7 in a shorter direction is accommodated because the optical sheet 7 extends downward from a top edge thereof supported by the seven support pins 50d.

The thermal expansion of the optical sheet 7 in the longitudinal direction is accommodated in the range of the length of each of the elliptical holes 7a provided to the sides of the circular central hole 7a because the elliptical holes 7a and the support pins 50d respectively inserted thereinto move with respect to each other. Therefore, the optical sheet 7 is kept supported in a superb manner with no influence of the thermal expansion.

By contrast, in the case where the display apparatus 1 is used in the state where the short side portion 50a is situated upward, the optical sheet 7 is suspended from the portion thereof held between the short side portion 50a of the sheet support portion 50 and the liquid crystal panel 2, and the movement of the optical sheet 7 in the up-down direction is restricted by the support pin 50d inserted into the center hole 7a. Therefore, the optical sheet 7 is supported without being sagged or wrinkled.

Thus, like in the case where the optical sheet 7 is used with the longer side portion 50c being situated upward, the optical sheet 7 diffuses and converges the light output from the light guide plate 31 and outputs the light toward the liquid crystal panel 2 in a superb manner, and allows the liquid crystal panel 2 to display an image stably.

In the case where the display apparatus 1 is used in the state where the short side portion 50a is situated upward, the load applied to the optical sheet 7 by being supported is dispersed to the portion thereof held by the short side portion 50a and the portion thereof supported by the support pins 50d. Therefore, the risk that areas around the holes 7a, into which the support pins 50d are inserted, are broken by the concentration of the load is alleviated. In addition, the optical sheet 7 is prevented from being pulled out from the support pins 50d and thus coming off, and is kept supported stably.

(Embodiment 2)

Figure 4:
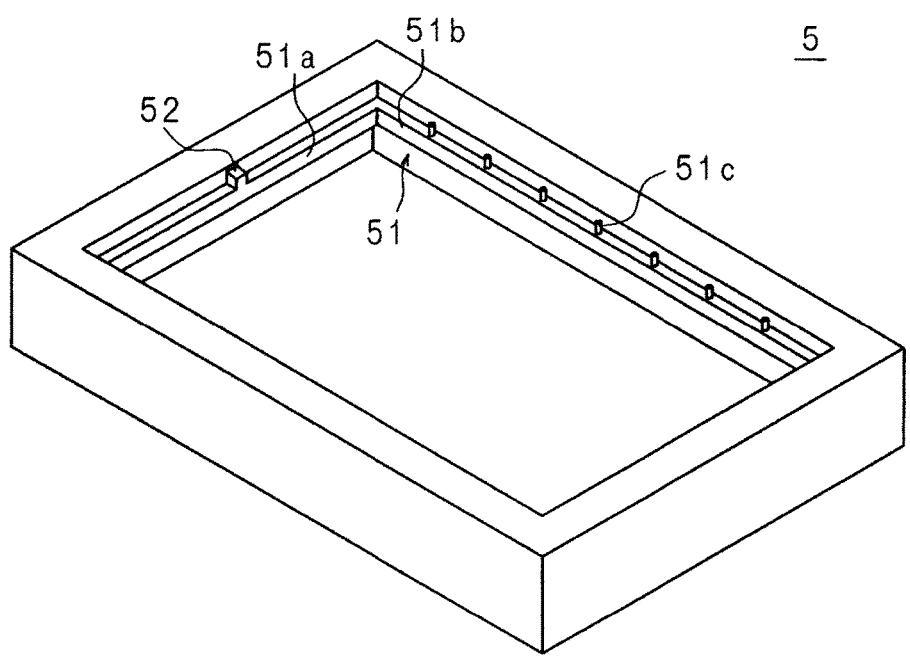
FIG. 4 is an external isometric view of a panel chassis of a display apparatus according to embodiment 2.

FIG. 4 is an external isometric view of a panel chassis 5 a display apparatus according to embodiment 2. Like in embodiment 1, the panel chassis 5 includes a rectangular frame and side plates vertically rising from an outer peripheral edge of the frame. An inner circumferential surface of the frame of the panel chassis 5 has a sheet support portion 51 protruding inward therefrom. The sheet support portion 51 supports the optical sheet 7. The sheet support portion 51 is formed integrally with the panel chassis 5, which decreases the number of the components of the display apparatus.

The sheet support portion 51 includes two long side portions and two short side portions. One of the long side portions, namely, a long side portion 51b, has seven support pins 51c protruding therefrom toward the frame. Like in the display apparatus according to embodiment 1, the support pins 51c provided along the long side portion 51b are inserted into the holes 7a, so that the optical sheet 7 is supported by the sheet support portion 51.

By contrast, one of the short side portions, namely, a short side portion 51a, has, at a center thereof in a longitudinal direction thereof, a protruding portion 52 protruding therefrom toward the frame. The protruding portion 52 is located closer to the liquid crystal panel 2 than the side portions of the sheet support portion 51 other than the short side portion 51a, and a portion of the optical sheet 7 corresponding to the protruding portion 52 is held between the liquid crystal panel 2 and the protruding portion 52, like in embodiment 1.

In the case where the panel chassis 5 in embodiment 1 is used, the display apparatus 1 may be used in a state where the long side portion 51b of the sheet support portion 50 is situated upward, or may be used in a state where the short side portion 51a is situated upward.

In the case where the display apparatus 1 is used in the state where the long side portion 51b of the sheet support portion 51 is situated upward, the optical sheet 7 is suspended by the weight thereof from the seven support pins 51c provided along the long side portion 51b and is used without being sagged or wrinkled. Therefore, the optical sheet 7 diffuses and converges the light output from the light guide plate 31 and outputs the light toward the liquid crystal panel 2 in a superb manner. Thus, the liquid crystal panel 2 displays an image stably.

The optical sheet 7 is thermally expanded mainly by the action of the heat generated by the light emission of the light source 32. The thermal expansion of the optical sheet 7 in a shorter direction is accommodated because the optical sheet 7 extends downward from the top edge thereof supported by the seven support pins 51c.

The thermal expansion of the optical sheet 7 in the longitudinal direction is accommodated in the range of the length of each of the elliptical holes 7a provided to the sides of the circular central hole 7a because the elliptical holes 7a and the support pins 50d respectively inserted thereinto move with respect to each other. Therefore, the optical sheet 7 is kept supported in a superb manner with no influence of the thermal expansion.

By contrast, in the case where the display apparatus 1 is used in the state where the short side portion 51a is situated upward, the optical sheet 7 is suspended from the portion thereof held between the protruding portion 52 of the sheet support portion 51 and the liquid crystal panel 2, and the movement of the optical sheet 7 in the up-down direction is restricted by the support pin 51c inserted into the center hole 7a. Therefore, the optical sheet 7 is supported without being sagged or wrinkled.

Thus, like in the case where the optical sheet 7 is used with the longer side portion 51b being situated upward, the optical sheet 7 diffuses and converges the light output from the light guide plate 31 and outputs the light toward the liquid crystal panel 2 in a superb manner, and allows the liquid crystal panel 2 to display an image stably.

In the case where the display apparatus 1 is used in the state where the short side portion 51a is situated upward, the load applied on the optical sheet 7 by being supported is dispersed to the portion thereof held by the protruding portion 52 and the portion thereof supported by the support pins 51c. Therefore, the risk that areas around the holes 7a, into which the support pins 51c are inserted, are broken by the concentration of the load is alleviated. In addition, the optical sheet 7 is prevented from being pulled out from the support pins 51c and thus coming off, and is kept supported stably.

The optical sheet 7 is held only at a central portion thereof corresponding to the protruding portion 52. Therefore, the expansion of the optical sheet 7 in the shorter direction is accommodated.

The embodiments disclosed above are examples in all the aspects and should not be construed as limiting the present invention in any way. It is intended that the scope of the present invention is not limited to any of the above-described embodiments and encompasses the equivalents of the claims and all the modifications in the scope of the claims. Namely, embodiments obtained by a combination of any of technological measures provided as optional modifications within the scope of the claims are also encompassed in the technological scope of the present invention.

What is claimed is:

1. A display apparatus, comprising:
   a display panel to display an image on a front surface thereof;
   a light guide plate being configured such that an upper surface thereof faces a rear surface of the display panel;
   an optical sheet being located between the display panel and the light guide plate, and having first and second sides parallel to each other and third and fourth sides perpendicular to the first and second sides, a plurality of holes along the third side, the holes including a circular hole and a plurality of elliptical holes on both sides of the circular hole;
   a panel support portion including a frame that has a first surface being in contact with the upper surface of the light guide plate and a second surface supporting a peripheral edge of the rear surface of the display panel; and
   a sheet support portion protruding from the frame of the panel support portion into a gap between the light guide plate and the optical sheet, the sheet support portion having a plurality of pins to be inserted into the plurality of holes,
   wherein the sheet support portion has a protruding portion that holds at least one portion of the first side of the optical sheet between the protruding portion itself and the display panel.

2. The display apparatus according to claim 1, wherein:
   the second side of the optical sheet is supported by an upper surface of the sheet support portion to form a gap between the optical sheet itself and the display panel.

3. The display apparatus according to claim 1, wherein:
   the third and fourth sides of the optical sheet are supported by an upper surface of the sheet support portion to form a gap between the optical sheet itself and the display panel.

4. The display apparatus according to claim 1, wherein:
   the protruding portion is configured to hold only a center portion of the first side of the optical sheet between the protruding portion itself and the display panel.

5. The display apparatus according to claim 1, wherein:
   the protruding portion is configured to hold throughout the first side of the optical sheet between the protruding portion itself and the display panel.

6. The display apparatus according to claim 1, further comprising:
   a chassis having a bottom plate and side plates vertically rising from the bottom plate, and
   a light source fixed to one of the side plates so as to face one side surface of the light guide plate.

7. The display apparatus according to claim 6, wherein
   the panel support portion further includes side plates vertically rising from an outer peripheral edge of the frame,
   the side plates of the panel support portion are located outer to the side plates of the chassis, and
   the light guide plate is held between the first surface of the frame and the bottom plate.

8. The display apparatus according to claim 6, wherein
   the light source is fixed to one of the side plates of the chassis, which is closest to the fourth side of the optical sheet.

9. The display apparatus according to claim 1, wherein
   the first and second sides are shorter than the third and fourth sides.

* * * * *